Patented May 13, 1947

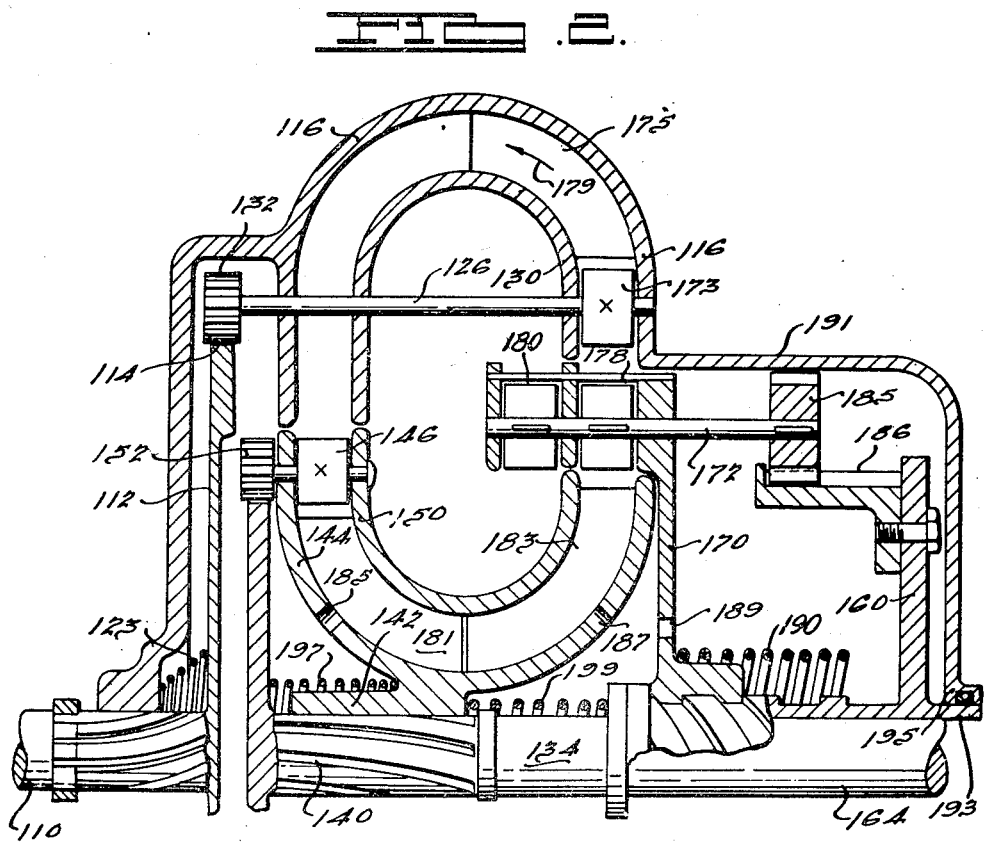

2,420,429

UNITED STATES PATENT OFFICE 2,420,429

ROTARY HYDRAULIC TORQUE CONVERTER AND FLUID COUPLING

Joseph Jandasek, Highland Park, Mich., assignor to Bendix Aviation Corporation, South Bend, Ind., a corporation of Delaware Application October 23, 1943, Serial No. 507,364

12 Claims. (Cl. 60—54)

This invention relates to transmissions and more particularly to fluid transmissions operative as torque converters or as fluid clutches depending on variations of fluid reaction and power transmitted by the device.

An object of this invention is to provide a fluid transmission having angularly adjustable fluid deflecting blades controlled by fluid reaction in the power transmitting fluid circuit.

Another object of this invention is to provide a fluid transmission having angularly adjustable fluid energizing and energy absorbing blades controlled by axial movement of the impeller and turbine under the influence of variations of fluid reaction on the impeller and turbine.

A further object of the invention is to provide a fluid transmission having angularly adjustable impeller, turbine and guide wheel members controlled by axial movement of their associated supporting members.

Yet another object of the invention is to provide improved means for varying the angular relation of fluid deflecting vanes by relative movement between the vane carrying member and a member associated therewith.

Other objects and advantages of this invention will be apparent from the following detailed description considered in connection with the accompanying drawings, submitted for purposes of illustration only and not intended to define the scope of the invention, reference being had for that purpose to the subjoined claims.

In the drawings wherein similar reference characters refer to similar parts throughout the several views:

Fig. 2 is a view similar to Fig. 1 illustrating a modified form of the invention.

Figure 1:
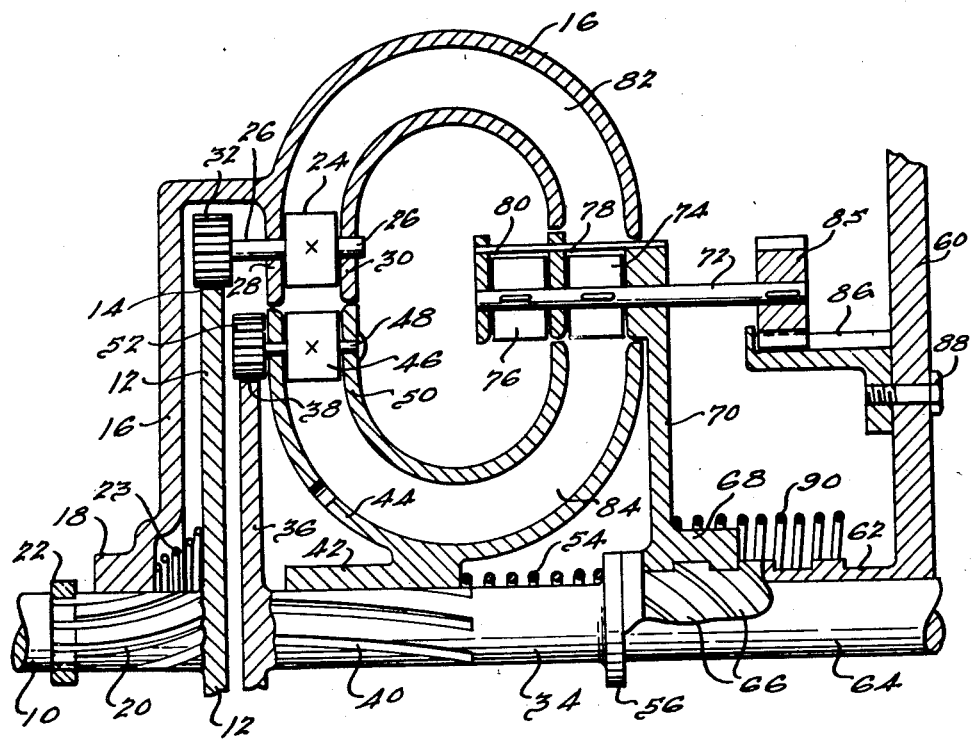
Fig. 1 is a longitudinal sectional view of a fluid transmission embodying the present invention.

Before explaining in detail the present invention it is to be understood that the invention is not limited in its application to the details of construction and arrangement of parts illustrated in the accompanying drawings, since the invention is capable of other embodiments and of being practiced or carried out in various ways.

Referring now more particularly to the embodiment of the invention illustrated in Fig. 1 it will be observed that a driving shaft 10 has a flange 12 carrying a ring gear 14. An impeller housing 16 provided with an internally threaded hub 18 is mounted for travel on helical threads 20 on the driving shaft 10 between a stop 22 and the flange 12. The helical threads 20 effect rotational and axial movements of the hub 18 and hence the impeller housing 16 supported on the hub, and a spring 23 is provided to yieldingly urge the housing 16 towards the stop member 22.

The impeller housing 16 supports a plurality of fluid energizing impeller blades 24 fixed to shafts 26 rotatably mounted in impeller web and shroud 28 and 30 carried by the impeller housing 16. The shafts 26 have thereon pinions 32 meshing with the ring gear 14 on the flange 12 carried by the driving shaft 10.

A driven shaft 34 preferably axially aligned with the driving shaft 10 has a flange 36 supporting a ring gear 38. The driven shaft 34 has helical threads 40 and a hub 42 mounted for travel on the threads 40 supports a turbine web 44. Rotation of the shaft 34 sets up rotational and axial movements of the hub.

A plurality of spaced energy absorbing vanes 46 are fixed to shafts 48 journaled in the turbine web 44 and a turbine shroud 50 fixed to the web 44. The shafts 48 have thereon pinions 52 meshing with the ring gear 38 on the flange 36 so as to rotate the shafts 48 and vary the angular position of the turbine vanes 46 as the turbine moves axially on the driven shaft 34. Yielding means such for example as a spring 54 sleeved on the driven shaft 34 between the hub 42 and a flange 56 carried by the shaft 34 is provided to yieldingly urge the turbine toward the left as viewed in Fig. 1.

A stationary member 60 has a sleeve 62 fitted on a driven shaft 64 and the sleeve has helical threads 66 extending at an angle to the longitudinal axis of the shaft as illustrated. A guide wheel hub 68 having internal helical threads complementary to the threads 66 is mounted on the sleeve 62 of the stationary member 60 for rotative and axial movements thereon. A radially extended flange 70 on the guide wheel hub 68 supports a plurality of spaced shafts 72. Each of the shafts 72 has thereon spaced guide wheel vanes 74 and 76 positioned in guide wheel channels 78 and 80 and adapted to be successively introduced into the power transmitting fluid circuit formed by the impeller and turbine channels 82 and 84 to operate the device as a torque converter or as a fluid clutch.

Each of the shafts 72 has thereon a pinion 85 in mesh with a helical ring gear 86 supported on the stationary member 60 and secured thereto in any suitable manner as by means of bolts 88. The ring gear 86 has its teeth set at a slightly different angle from the helical threads 66 on the stationary sleeve 62 to insure a desired rotation of the shafts 72 to vary the angular relation of the vanes 74 and 76 to change the power transmitting characteristics of the device.

Yielding means such for example as a spring 80 interposed between the radially extended flange 70 and the stationary member 60 may be provided to yieldingly urge the guide wheel flange 70 toward the left as viewed in Fig. 1 to position the guide wheel channel 78 in the fluid circuit to operate the device as a torque converter.

The operation of this device is as follows: Power applied to the driving shaft 10 is transmitted through the impeller hub 18 mounted on the helical threads 20 to rotate the impeller housing 16 whereupon the impeller vanes 24 impart energy to the power transmitting liquid.

Circulating liquid is directed to the turbine channel where energy is absorbed by the turbine vanes 46 interposed between the web and shroud 44 and 50 respectively. Energy thus imparted to the turbine is directed through the turbine hub 42 to the driven shaft 34.

When heavy loads are being transmitted under conditions where high torque multiplication is desired the guide wheel circuit 78 will be in the power transmitting circuit between the impeller channel 82 and the turbine channel 84. The guide wheel vanes 74 positioned in the guide wheel channel 78 are of relatively thick contour and embody considerable curvature whereupon the flow of fluid is rectified and directed to the impeller channel 82 in such a manner as to transmit energy with torque multiplication.

When the load to which the driven shaft is subjected is decreased or the power applied to the driving shaft increases the device speeds up and the fluid reaction in the power transmitting fluid circuit decreases. The impeller housing 16 being mounted on the angularly disposed helical threads 20 of the driving shaft 10 shifts axially on the driving shaft under the influence of variations of fluid reaction in the fluid circuit.

Axial movement of the impeller housing 16 on the driving shaft 10 is accompanied by rotational movement of the housing 16 relative to the shaft 10. This rotational movement changes the angular relation of the impeller vanes 24 because the pinions 32 rotate with the impeller housing 16, and the ring gear 14 moves with the driving shaft 10. The fluid energizing characteristics of the impeller are thus varied in accordance with variations of fluid reaction in the power transmitting fluid circuit or the ratio between the applied power and the load to which the device is subjected.

The turbine hub 42 on the helical threads 40 of the driven shaft 34 is free for axial movement on the shaft and will seek a position wherein the torsional forces due to the absorption of power in the turbine channel 84 balance the frictional and yielding forces exerted between the turbine hub and the driven shaft 34.

Variation in the ratio of power applied and the power transmitted causes axial shifting of the turbine on the driven shaft 34. Due to the rotational component of the helical threads 40 this axial movement results in a slight angular movement of the turbine on the driven shaft. This slight angular movement of the turbine on the driven shaft 34 is effective through the ring gear 38 and pinion gears 52 to vary the angular relation of the turbine vanes 46 and hence the energy absorbing characteristics of the device.

When the load transmitted decreases or the power applied increases the fluid reaction in the power transmitting fluid circuit decreases. This reduction in fluid reaction exerted on vanes 74 in the guide wheel channel 78, coupled with frictional forces exerted on the guide wheel structure, exerts a force to rotate the guide wheel member in the direction of fluid flow. As the guide wheel hub 68 rotates on the helical threads 66 of the stationary member 62 it shifts axially to retract the guide wheel channel 78 from the fluid circuit and introduce the channel 80 having the guide wheel vanes 76 into the power transmitting fluid circuit.

The guide wheel vanes 76 are generally similar to the guide wheel vanes 74 but are of smaller cross section and embody less curvature whereupon the fluid deflecting force to which the fluid is subjected is decreased. When the vanes 76 are in the circuit the device may operate as a fluid clutch to transmit power with virtually no torque multiplication. If desired the guide wheel vanes 76 may have a ratio of contour and curvature to operate the device as a torque converter to transmit power with less torque multiplication than is involved when the guide wheel channel 78 with its vanes 74 is positioned in the fluid circuit.

Axial movement of the guide wheel assembly on the stationary member 62 results in slight rotational movement of the pinions 85 relative to the hub 68 and flange 70 because of the difference in angularity of the helical threads 86 and 66. The angular relation of the guide wheel vanes 74 and 76 is thus varied dependent on the position of the guide wheel assembly. The power transmitting characteristics of the device may thus be varied as desired.

It will be noted that the spring 90 engaging the guide wheel flange 70 exerts a yielding force urging the guide wheel channel 78 into the power transmitting fluid circuit to transform the device to operate as a torque converter.

The embodiment of the invention illustrated in Fig. 2 is similar in many respects to that illustrated at Fig. 1. Corresponding parts have therefore been given corresponding reference numerals with the addition of 100.

It will be noted that the ring gear 114 carried by the flange 112 has a relatively large diameter. The shafts 126 having the pinions 132 meshing with the ring gear 114 are extended to project through the shroud 130 and housing 116 above the guide wheel assembly. The shafts 126 are provided with impeller vanes 173 adapted to impart energy to the power transmitting fluid as it is discharged from the guide wheel channel 178 or 180 when the device is operating as a torque converter or as a fluid clutch respectively.

The impeller vanes 173 are angularly adjustable by relative movement between the driving shaft 110 and the impeller housing 116 to vary the amount of energy imparted to the fluid in accordance with the variations of fluid reaction in the power transmitting fluid circuit.

Fluid discharged from the impeller vanes 173 is guided by fixed impeller vanes 175 interposed between the impeller shroud 130 and the impeller housing 116. The fluid circulates in the direction of the arrow 179 and after flowing through the entrance turbine vanes 146 it flows through fixed turbine vanes 181 and 183 interposed between the turbine web 144 and the turbine shroud 150.

It will be noted that the turbine web 144 is provided with apertures 185 and 187 to permit power transmitting fluid to flow freely through the turbine web to subject the web 144 to substantially equal pressures on opposite sides to more accurately control the axial movement of the turbine hub 142 on the helical splines 140 of the driven shaft 134. Calibrated springs 197 and 199 yieldingly urging the turbine hub 142 in opposite directions are provided to more definitely control the position of the turbine member on the driven shaft and to control the angularity of the energy absorbing turbine vanes 146.

The guide wheel flange 170 is also provided with an aperture 189 so as to substantially equalize pressures on opposite sides thereof to more accurately control the axial position of the guide wheel member.

The impeller housing 116 is provided with a case portion 191 extending over the pinions 185 and the stationary member 160 to close the space between the impeller housing and a stationary sleeve 199 extending between the driven shaft 164 and a seal 195 carried by the case 191.

The operation of this embodiment of the invention is substantially the same as that of Fig. 1 except for the more efficient operation resulting from the use of additional fluid energizing and energy absorbing vanes, and more positive control of the axial position of the impeller and turbine members controlling the angularity of the impeller and turbine vanes.

This is a continuation in part of my copending application Serial No. 364,968 filed November 9, 1940, and now abandoned.

I claim:

1. A fluid transmission comprising driving and driven shafts having radially extending flanges terminating in ring gears, impeller and turbine wheels cooperating to form a power transmitting fluid circuit, connecting means between the impeller and turbine wheels and the driving and driven shafts respectively comprising axially extending helical threads whereby said wheels may shift axially on the driving and driven shafts and rotate relative to the ring gears, angularly movable impeller and turbine vanes in the fluid circuit, pinion gears controlling said vanes, and means actuated by rotational movement between the ring gears and the impeller and turbine wheels to vary the angular relation of the vanes in the fluid circuit.

2. A fluid transmission comprising driving and driven shafts, impeller and turbine members mounted on the driving and driven shafts respectively and cooperating to form a power transmitting fluid circuit, spaced angularly movable impeller and turbine vanes in the fluid circuit, helical connecting means between the driving and driven shafts and the impeller and turbine members respectively whereby the impeller and turbine members may rotate slightly relative to the driving and driven shafts under the influence of variations of pressure in the fluid circuit, and means operated by rotational movement of the impeller and turbine members relative to the driving and driven shafts to vary the angular relation of the impeller and turbine vanes to change the power transmitting characteristics of the device.

3. A fluid transmission comprising driving and driven shafts having radially extending flanges terminating in ring gears, impeller and turbine wheels cooperating to form a power transmitting fluid circuit, connecting means between the impeller and turbine wheels and the driving and driven shafts respectively comprising axially extending helical threads whereby said wheels may shift axially on the driving and driven shafts and rotate relative to the ring gears, angularly movable impeller and turbine vanes in the fluid circuit, pinion gears controlling said vanes, means actuated by rotational movement between the ring gears and the impeller and turbine wheels to vary the angular relation of the vanes in the fluid circuit, a stationary member, a guide wheel, and means influenced by variations of pressure in the fluid circuit to vary the position of the guide wheel in the circuit to vary the torque transmitting characteristics of the transmission.

4. A fluid transmission comprising an impeller and a turbine cooperating to form a power transmitting fluid circuit, a stationary member, a guide wheel having a plurality of spaced fluid deflecting vaned portions adapted to be successively introduced into the power transmitting fluid circuit to operate the transmission as a torque converter or as a fluid clutch, motion transmitting means between the guide wheel member and the stationary member whereby either of said vaned portions of the guide wheel may be introduced into the fluid circuit, and a second motion transmitting means between the stationary member and the guide wheel whereby the angles of the fluid deflecting vaned portions of the guide wheel may be varied as the guide wheel moves on the stationary member.

5. A fluid transmission comprising driving, driven and stationary members, impeller, turbine and guide wheel members carried by the driving, driven and stationary members, respectively, helical driving means between the driving shaft and the impeller, helical driving means between the driven shaft and the turbine, helical driving means between the stationary member and the guide wheel member, angularly movable vanes in the impeller, turbine and guide wheel members respectively, and motion transmitting means to vary the angle of said vanes upon relative movement of the respective helical driving means.

6. In a fluid transmission a driving shaft, a driven shaft, an impeller housing, connecting means between the impeller housing and the driving shaft whereby the impeller housing may shift axially on the driving shaft and oscillate thereon, angularly movable fluid energizing impeller vanes, and motion transmitting means operated by oscillating movement of the impeller housing on the driving shaft to vary the angular position of the impeller vanes.

7. A fluid transmission comprising driving, driven and stationary members, impeller, turbine and guide wheel members carried by the driving, driven and stationary members respectively, helical driving means between the driving shaft and the impeller, helical driving means between the driven shaft and the turbine, helical driving means between the stationary member and the guide wheel member, angularly movable vanes in the impeller, turbine and guide wheel members, and motion transmitting means between the impeller, turbine and guide wheel vanes and the driving, driven and stationary members respectively to vary the angle of said vanes in response to variations of fluid reaction in the fluid circuit.

8. A fluid transmission comprising driving, driven and stationary members, impeller, turbine and guide wheel members carried by the driving, driven and stationary members respectively, helical driving means between the driving shaft and the impeller, helical driving means between the driven shaft and the turbine, helical driving means between the stationary member and the guide wheel member, angularly movable vanes in the impeller, turbine and guide wheel members, and motion transmitting means to vary the angle of said vanes upon relative movement of the helical driving means between the impeller, turbine and guide wheel vanes and the driving, driven and stationary members respectively, to vary the angle of said vanes in response to variations of fluid reaction in the fluid circuit, the turbine and guide wheel members having apertured webs to substantially balance fluid pressures on opposite sides and the impeller housing surrounding the turbine and guide wheel members and being concentrically mounted on the driving and driven shafts.

9. A fluid transmission including retractile guide vanes, and means controlled by retractable movement of the vanes operative to change the angularity thereof.

10. A fluid transmission including means for energizing fluid, means for receiving energy from the fluid, retractile guide vanes for deviating the fluid, and means for changing the angularity of the vanes influenced by retractable movement thereof.

11. A fluid transmission including primary means for energizing fluid and secondary means for receiving energy from the fluid providing in conjunction with one another a fluid circuit, guide vanes movable into and out of the circuit, and means controlled by movement of the vanes operative to change the angularity thereof.

12. A fluid transmission including primary means for energizing fluid and secondary means for receiving energy from the fluid providing in conjunction with one another a power transmitting fluid circuit, guide vanes movable into and out of the circuit, and means for automatically changing the angularity of the vanes as the result of said movement.

JOSEPH JANDASEK.

REFERENCES CITED

The following references are of record in the file of this patent:

UNITED STATES PATENTS

| Number | Name | Date |
|---|---|---|
| 2,122,169 | Wilson | June 28, 1938 |
| 2,222,618 | Jandasek | Nov. 26, 1940 |
| 2,235,370 | Jandasek | Mar. 18, 1941 |
| 2,271,919 | Jandasek | Feb. 3, 1942 |

FOREIGN PATENTS

| Number | Country | Date |
|---|---|---|
| 332,927 | Germany | 1921 |
| 94,287 | Sweden | 1922 |